(12) United States Patent
Nash et al.

(10) Patent No.: US 11,057,608 B2
(45) Date of Patent: Jul. 6, 2021

(54) DEPTH MAP GENERATION IN STRUCTURED LIGHT SYSTEM

(71) Applicant: QUALCOMM Incorporated, San Diego, CA (US)

(72) Inventors: James Wilson Nash, San Diego, CA (US); Kalin Mitkov Atanassov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 768 days.

(21) Appl. No.: 15/147,736

(22) Filed: May 5, 2016

(65) Prior Publication Data

US 2017/0195656 A1 Jul. 6, 2017

Related U.S. Application Data

(60) Provisional application No. 62/274,600, filed on Jan. 4, 2016.

(51) Int. Cl.
*G01N 21/86* (2006.01)
*G06K 9/00* (2006.01)
(Continued)

(52) U.S. Cl.
CPC ....... *H04N 13/271* (2018.05); *G01B 11/2513* (2013.01); *G06T 7/50* (2017.01);
(Continued)

(58) Field of Classification Search
CPC ... G01B 11/2513; G01B 11/25; G01B 11/254; G01B 11/22; G01B 11/14; G06T 7/521;
(Continued)

(56) References Cited

U.S. PATENT DOCUMENTS

| 5,500,754 A | 3/1996 | Orino et al. |
| 6,700,669 B1 | 3/2004 | Geng |

(Continued)

FOREIGN PATENT DOCUMENTS

| CN | 101403606 A | 4/2009 |
| CN | 101697233 A | 4/2010 |

(Continued)

OTHER PUBLICATIONS

Klarquist, et al., FOVEA: A Foveated Vergent Active Stereo Vision System for Dynamic Three-Dimensional Scene Recovery, Oct. 1998, IEEE Transactions on Robotics and Automation, vol. 14, No. 5 (Year: 1998).*

(Continued)

*Primary Examiner* — Alison Slater
(74) *Attorney, Agent, or Firm* — QUALCOMM Incorporated

(57) ABSTRACT

Techniques are disclosed for depth map generation in a structured light system where an optical transmitter is tilted relative to an optical receiver. The optical transmitter has a transmitter optical axis around which structured light spreads, and the optical receiver has a receiver optical axis around which a reflection of the structured light can be captured. The transmitter optical axis and the receiver optical axis intersect one another. A processing circuit compensates for the angle in the tilt in the reflected pattern to generate the depth map.

25 Claims, 9 Drawing Sheets

(51) Int. Cl.
| | |
|---|---|
| *G06K 9/34* | (2006.01) |
| *G06K 9/36* | (2006.01) |
| *H04N 13/271* | (2018.01) |
| *H04N 13/254* | (2018.01) |
| *G01B 11/25* | (2006.01) |
| *G06T 7/521* | (2017.01) |
| *G06T 7/50* | (2017.01) |
| *H04N 13/00* | (2018.01) |

(52) U.S. Cl.
CPC .......... *G06T 7/521* (2017.01); *H04N 13/254* (2018.05); *H04N 2013/0081* (2013.01)

(58) Field of Classification Search
CPC .......... G06T 2207/10028; G06T 7/50; H04N 13/254; H04N 13/271; H04N 2013/0081
See application file for complete search history.

(56) References Cited

U.S. PATENT DOCUMENTS

| | | | |
|---|---|---|---|
| 7,253,839 | B2 | 8/2007 | Kato |
| 8,886,449 | B2 | 11/2014 | Vaddadi et al. |
| 9,188,433 | B2 | 11/2015 | Atanassov et al. |
| 2007/0023716 | A1 | 2/2007 | van der Burgt et al. |
| 2009/0096783 | A1 | 4/2009 | Shpunt et al. |
| 2012/0262553 | A1 | 10/2012 | Chen et al. |
| 2012/0275747 | A1 | 11/2012 | Kimura et al. |
| 2013/0314696 | A1 | 11/2013 | Atanassov et al. |
| 2013/0329942 | A1 | 12/2013 | Sonoda et al. |
| 2014/0043610 | A1* | 2/2014 | Engel .................... G01B 11/14 356/369 |
| 2014/0152769 | A1 | 6/2014 | Atwell et al. |
| 2015/0043008 | A1 | 2/2015 | Blanckaert et al. |
| 2016/0146594 | A1 | 5/2016 | Nishio et al. |

FOREIGN PATENT DOCUMENTS

| | | |
|---|---|---|
| CN | 201828247 U | 5/2011 |
| CN | 102999910 A | 3/2013 |
| CN | 102760234 B | 8/2014 |
| CN | 104165596 A | 11/2014 |
| CN | 104793784 A | 7/2015 |
| DE | 10049382 A1 | 4/2002 |
| DE | 10214817 A1 | 10/2003 |
| JP | 2010538269 A | 12/2010 |
| JP | 2011128117 A | 6/2011 |
| JP | 2013088261 A | 5/2013 |
| JP | 2015517100 A | 6/2015 |
| WO | 2009032641 A1 | 3/2009 |
| WO | 2011077693 A1 | 6/2011 |
| WO | 2013106291 A1 | 7/2013 |
| WO | 2013176808 A1 | 11/2013 |
| WO | 2014203139 A1 | 12/2014 |
| WO | 2016005976 A2 | 1/2016 |

OTHER PUBLICATIONS

Response to Written Opinion from corresponding PCT Application Serial No. PCT/US2016/059703 filed on Feb. 27, 2017 (18 pages).
International Search Report and Written Opinion of International Application No. PCT/US2016/059703, dated Jan. 17, 2017, 13 pp.
Li J., et al., "Large Depth-of-View Portable Three-Dimensional Laser Scanner and its Segmental Calibration for Robot Vision", Optics and Lasers in Engineering, Elsevier, Amsterdam, NL, vol. 45, No. 11, Aug. 31, 2007 (Aug. 31, 2007), XP022226755, pp. 1077-1087.
Second Written Opinion from corresponding PCT Application Serial No. PCT/US2016/059703 dated Jan. 4, 2018 (9 pages).
International Preliminary Report on Patentability from corresponding PCT Application Serial No. PCT/US2016/059703 dated Apr. 12, 2018 (25 pages).
Dehai Z., et al., "Reverse Engineering Application of 3D Optical Scanning Technology", Journal of Applied Optics, vol. 36, No. 4, Jul. 2015, pp. 519-530.
Marton F., et al., "Natural Exploration of 3D Massive Models on Large-Scale Light Field Displays Using the Fox Proximal Navigation Technique", Computer and Graphics, vol. 36, Issue 8, Dec. 2012, pp. 893-903.
Qing-Yong Z., et al., "Application of Photographic Displacement Measurement Technology in Aircraft Static Test", Measurement and Control Technology, vol. 34, No. 12, 2015, pp. 26-33.
Taiwan Search Report—TW105135188—TIPO—dated Apr. 18, 2020.

* cited by examiner

DEPTH MAP GENERATION IN STRUCTURED LIGHT SYSTEM

This application claims the benefit of U.S. Provisional Patent Application No. 62/274,600, filed Jan. 4, 2016, the entire content of which is hereby incorporated herein by reference.

TECHNICAL FIELD

This disclosure relates to depth map generation and more particularly to depth map generation in a structured light active sensing system.

BACKGROUND

Structured light active sensing systems transmit and receive patterns corresponding to spatial codes (codewords), to generate a depth map for a scene. The farther away an object is from the transmitter and receiver, the closer the received spatial code projection is to its original position at the receiver(s), as the outgoing spatial code projection and reflected incoming spatial code projection are more parallel. Conversely, the closer an object is to the transmitter and receiver, the farther the received spatial code projection is from its original position at the receiver(s). Thus, the difference between a received and a transmitted codeword position indicates the depth of an object in the scene. Structured light active sensing systems use these relative depths to generate a depth map, or a three dimensional representation of a scene.

SUMMARY

This disclosure describes example techniques of determining a depth map of objects where a transmitter that transmits structured light to the objects is angled relative to the receiver which receives a reflection of the structured light from the objects. For instance, the transmitter has an angle of view relative to a transmitter optical axis along which the structured light is spread, and the receiver has an angle of view relative to a receiver optical axis along which the reflected structured light is captured. In examples described in this disclosure, the transmitter optical axis and the receiver optical axis intersect due to the transmitter being angled relative to the receiver. As described in more detail, having the transmitter and receiver angled relative to one another may allow for a closer field of view and allow for easier design.

In one example, the disclosure describes a method of image processing, the method comprising transmitting structured light, with an optical transmitter, the optical transmitter having a first angle of view relative to a transmitter optical axis, receiving, with an optical receiver, a reflection of the structured light, the optical receiver having a second angle of view relative to a receiver optical axis, wherein the optical transmitter is angled relative to the optical receiver so that the transmitter optical axis intersects the receiver optical axis, and wherein a position of the optical transmitter relative to the optical receiver is constant, and generating a depth map for one or more images based on the received reflection of the structured light.

In one example, the disclosure describes a device for image processing, the device comprising an optical transmitter configured to transmit structured light, the optical transmitter having a first angle of view relative to a transmitter optical axis, an optical receiver configured to receive a reflection of the structured light, the receiver having a second angle of view relative to a receiver optical axis, wherein the optical transmitter is angled relative to the optical receiver so that the transmitter optical axis intersects the receiver optical axis, and wherein a position of the optical transmitter relative to the optical receiver is constant, and a processing circuit configured to generate a depth map for one or more images based on the received reflection of the structured light.

In one example, the disclosure describes a computer-readable storage medium including instructions stored thereon that when executed cause one or more processors of a device for image processing to cause an optical transmitter to transmit structured light, the optical transmitter having a first angle of view relative to a transmitter optical axis, and generate a depth map for one or more images based on a received reflection of the structured light, wherein the received reflection is received, with an optical receiver, the optical receiver having a second angle of view relative to a receiver optical axis, wherein the optical transmitter is angled relative to the optical receiver so that the transmitter optical axis intersects the receiver optical axis, and wherein a position of the optical transmitter relative to the optical receiver is constant.

In one example, the disclosure describes a device for image processing, the device comprising means for transmitting structured light, the means for transmitting having a first angle of view relative to a transmitter optical axis, means for receiving a reflection of the structured light, the means for receiving having a second angle of view relative to a receiver optical axis, wherein the means for transmitting is angled relative to the means for receiving so that the transmitter optical axis intersects the receiver optical axis, and wherein a position of the means for transmitting is constant relative to the means for receiving, and means for generating a depth map for one or more images based on the received reflection of the structured light.

The details of one or more examples are set forth in the accompanying drawings and the description below. Other features, objects, and advantages will be apparent from the description, drawings, and claims.

DETAILED DESCRIPTION

Figure 1A:
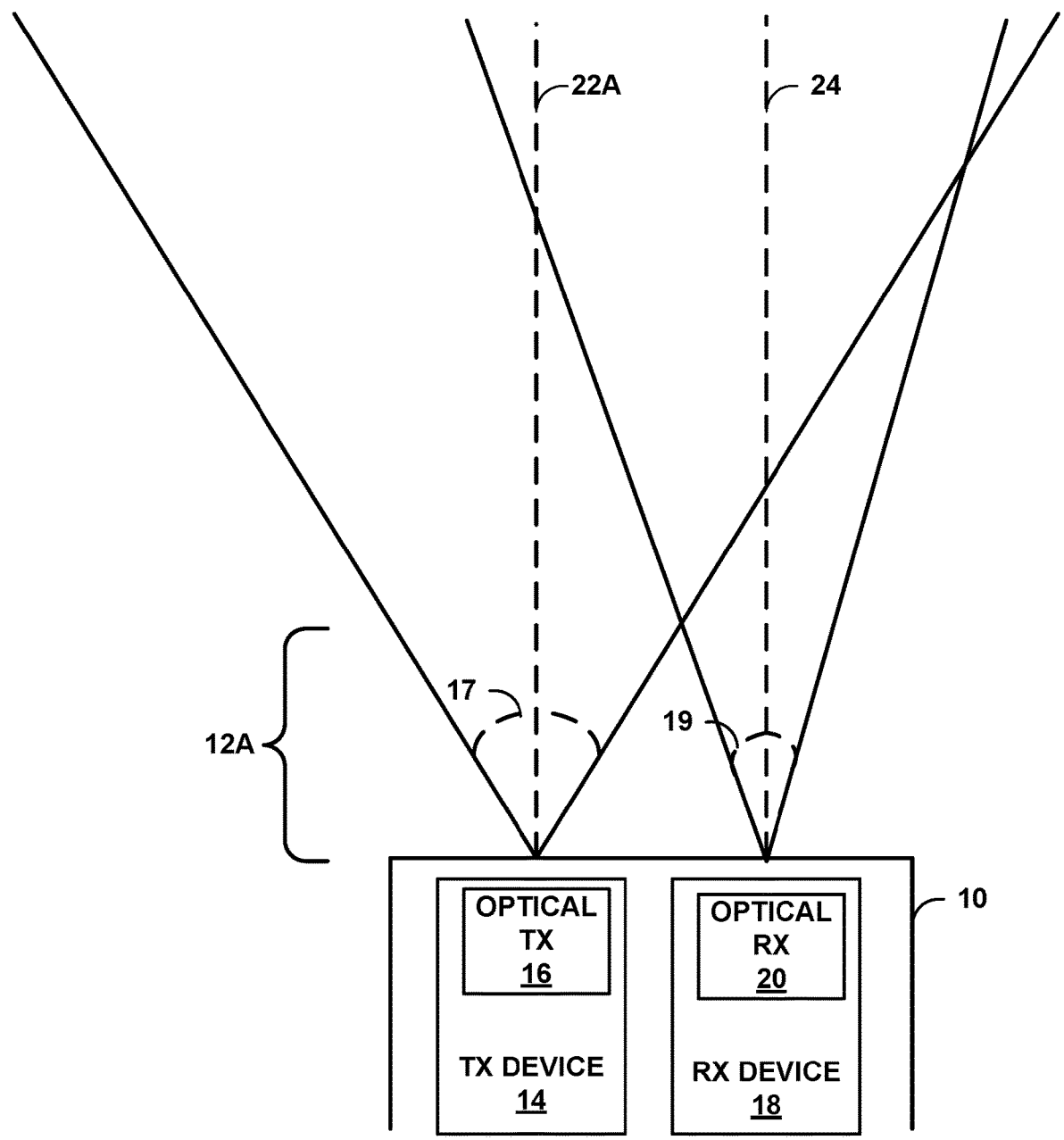
FIGS. 1A and 1B are conceptual diagrams illustrating examples of transmitter field and receiver field for generating a depth map.

To generate stereoscopic images that a user perceives to encompass a three-dimensional space, a device generates a depth map of the scene or object in the images to be rendered. One way to generate the depth map is in a structured light system, also referred to as a verged active stereo system. In the structured light system, a transmitter device projects a known pattern or code on a scene and a receiver device receives the pattern or code to obtain a depth map. For instance, the transmitter device transmits a structured light that includes the pattern or code on to the scene or object, and the receiver device receives a reflection of the structured light from the scene or object. The receiver device compares the received pattern or code to a list of known patterns or codes to confirm that the received pattern or code is valid.

Then, based on a position of where a receiver received the pattern or code, the receiver device may determine an estimate of the distance of the scene or object from the receiver. Based on the determined distances, the receiver device generates a depth map. A processing circuit (which may be a programmable and/or fixed function processing circuit) may then use the generated depth map to generate graphical data for one or more images (e.g., a graphics processing circuit (GPU) uses the depth map to generate stereoscopic images).

The transmitter device includes an optical transmitter to transmit the structured light and the receiver device includes an optical receiver to receive the structured light. The optical transmitter and the optical receiver are separated by a distance (B). The optical transmitter transmits the structured light, where the structured light encompasses a projection field. For instance, the optical transmitter has an angle of view relative to a transmitter optical axis. The transmitter optical axis is a line that extends outward from the optical transmitter and the angle of view defines the area across which the structured light spreads.

Similarly, the optical receiver has an angle of view relative to a receiver optical axis. The receiver optical axis is a line that extends outward from the optical receiver and the angle of view defines the area across which the optical receiver is able to capture the reflection of the structured light.

Because the optical transmitter and optical receiver are separated by distance B, the area over which the structured light spreads and the area over which the optical receiver can capture light are not the same. This results in areas where the structured light does not reach or areas where a reflection of the structured light cannot be captured. The angle of view of the transmitter and receiver also affects the projection field and the capture field. Accordingly, the optical transmitter and the optical receiver each have a respective field of view (e.g., projection field for the transmitter and capture field for the receiver), and the field of view overlap defines how much of the projection field and capture field overlap.

Designing a structured light system to generate the depth map is complex because great care may be needed to select components as characteristics of each component interplays with other characteristics of other components resulting in a careful balance of components. For instance, speckle noise tolerance sets a lower bound on aperture size, where an aperture size for the receiver defines the opening through which light is captured and an aperture size of the transmitter defines the opening through which light is projected. The aperture size for the receiver and the transmitter may be different, but the techniques are not so limited.

The depth of field (DoF) defines the focus range and sets the upper bound on the F-number, which is the ratio of a lens's focal length (e.g., the point where light converges from a lens) to the diameter of the aperture. The F-number therefore sets the lower bound on the focal length, and the focal length sets upper bound on field of view. The baseline distance (B) between transmitter and receiver sets the upper bound on system accuracy, and the baseline reduces the field of view overlap.

The field of view overlap sets the near field of view. The near field of view (e.g., how close an object can be within the field of view overlap) is particularly affected by all these example characteristics.

In some cases, having a near field of view that is relatively close may be desirable. For instance, if the device is a mobile device, the user may desire to generate a depth map of objects relatively close to the mobile device. However, to achieve a near field of view that is relatively close to the mobile device may require very precise selection of optical components needed to generate the depth map because, as described above, setting the field of view is interrelated with aperture size, focal length, and speckle noise tolerance as a few examples.

The techniques described in this disclosure provide a way to have a near field of view that is relatively close to the optical transmitter and optical receiver without limiting choices of optical components used for generating the depth map. With the techniques described in this disclosure, the setting of the near field of view is decoupled from the specific components allowing for setting a near field of view for depth map generation for a wide variety of optical components and structured light systems.

In examples described in this disclosure, the optical transmitter is tilted or angled relative to the optical receiver. For instance, rather than the optical transmitter and the optical receiver being oriented in the same direction (e.g., facing the same direction), there is an angle of tilt between the optical transmitter and the optical receiver. The angle of tilt between the optical transmitter and the optical receiver causes the projection field to tilt and intersect the capture field closer to the device as compared to the case where the optical transmitter and the optical receiver are oriented in the same direction. For example, if the optical transmitter and the optical receiver were oriented in the same direction, then the transmitter optical axis and the receiver optical axis would be parallel. In the examples described in this disclosure, tilt in the transmitter relative to the receiver results in the transmitter optical axis and the receiver optical axis not being parallel but intersecting.

The receiver device may capture the reflection of the structured light in examples where the optical transmitter is angled relative to the optical receiver. The receiver device determines the depth map based on the captured reflected structured light. However, in this case, the receiver device may need to compensate for the angle of the tilt in determining the depth map. For example, the receiver device may scale a position of each element in the received reflection of the structured light based on an angle of tilt of the optical transmitter relative to the optical receiver and a focal length of the optical receiver. The receiver device may generate the depth map based on the scaled position of each element in the received reflection of the structured light, each element in the structured light that corresponds to a respective element in the received reflection of the structured light, the focal length of the optical receiver, and a distance between the optical transmitter and the optical receiver (e.g., a baseline distance).

Accordingly, in examples described in this disclosure, the projector (i.e., optical transmitter) is intentionally tilted or angled to increase near field of view. The tilting or angling of the optical transmitter creates a "yaw" in the optical transmitter, and the techniques modify the calculations to accommodate for the known yaw. As described in more detail, the yaw also results in distorting the reflected pattern or code. However, in some cases, the receiver device may not need to compensate for the yaw to confirm that the reflected pattern or code is a valid pattern or code.

Figure 1B:
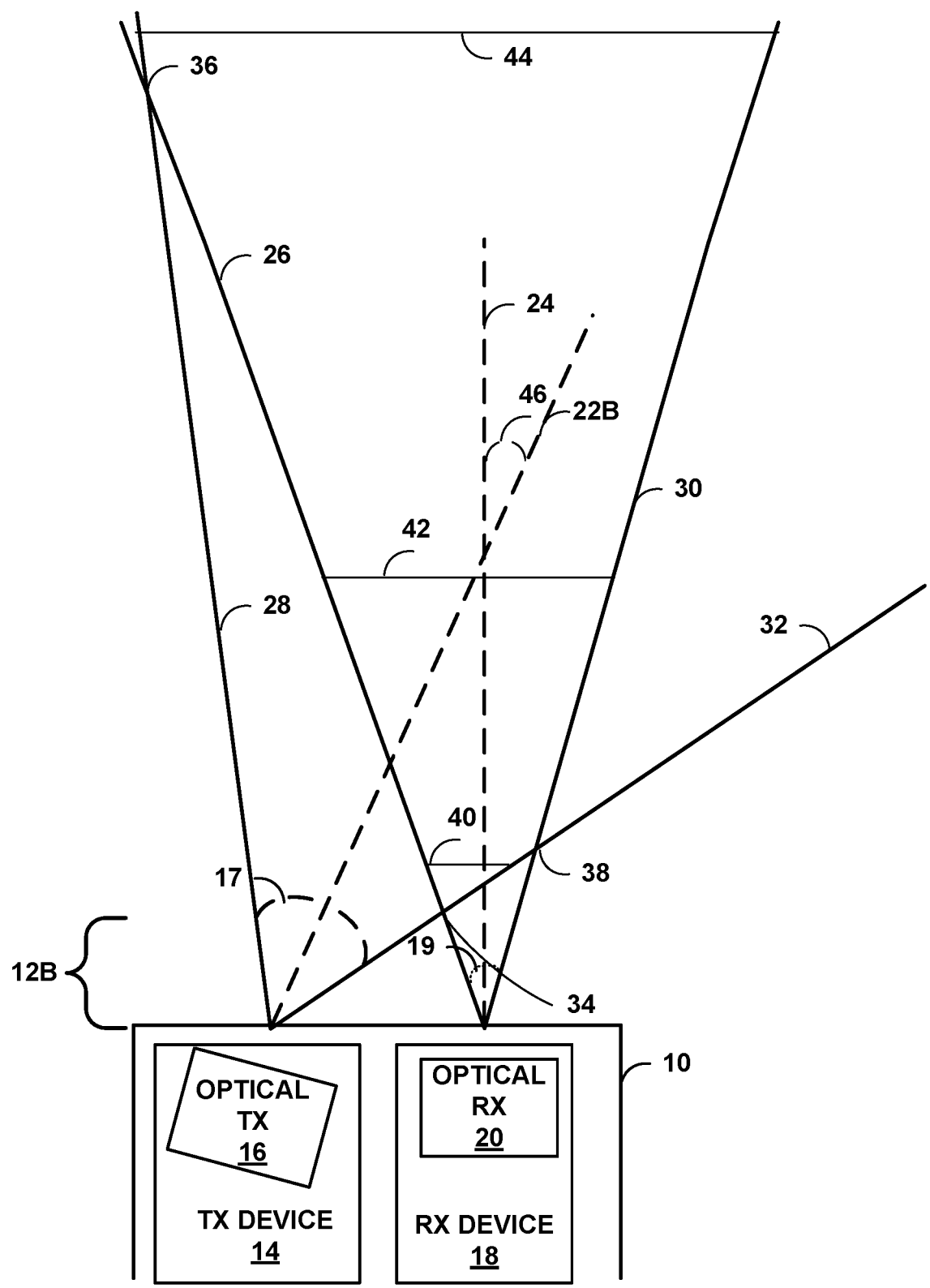

FIGS. 1A and 1B are conceptual diagrams illustrating examples of transmitter field and receiver field for generating a depth map. FIGS. 1A and 1B illustrate device 10 that includes transmitter device 14 that is coupled to optical transmitter 16 and receiver device 18 that is coupled to optical receiver 20. Examples of device 10 include a desktop computer, a laptop computer, a tablet, a wireless communication device, a phone, a television, a camera, a display device, a digital media player, a video game console, a video gaming console, or a video streaming device.

Examples of transmitter device 14 and receiver device 18 include a microprocessor, an integrated circuit, a digital signal processor (DSP), a field programmable gate array (FPGA), or application specific integrated circuit (ASIC). In general, transmitter device 14 and receiver device 18 include processing circuitry including programmable circuitry. Examples of optical transmitter 16 include a laser, and examples of optical receiver 20 include one or more optical sensors. In some examples, the laser outputs light (i.e., the depth map) in the infrared spectrum and the sensor receives the light (i.e., the depth map) in the infrared spectrum.

Although optical transmitter 16 is illustrated as part of transmitter device 14 and optical receiver 20 is illustrated as part of receiver device 18, the techniques described in this disclosure are not so limited. In some examples, transmitter device 14 and receiver device 18 may not include respective ones of optical transmitter 16 and optical receiver 20. In some examples, transmitter device 14 and receiver device 18 may be formed in the same integrated circuit along with other processing circuits forming a system on chip (SoC).

Transmitter device 14 may be configured to cause optical transmitter 16 to transmit structured light that includes a pattern or codeword. For instance, transmitter device 14 may include a local memory that stores a pattern or codewords used for depth map generation. A processing circuit of transmitter device 14 retrieves a pattern or codewords and causes optical transmitter 16 to transmit the pattern or codeword. The pattern or codeword reflects from objects and is received, through a lens or aperture, as a pattern or codeword reflection by optical receiver 20.

The reflections of the pattern or codeword are captured at different locations on optical receiver 20. For instance, assume that a first object is a first distance away from device 10, and a second object is a second distance away from device 10. In this example, the pattern or codeword that reflects off of the first object would appear at a first location on optical receiver 20 and the pattern or codeword that reflects off of the second object would appear at a second location on optical receiver 20. In this example, the disparity between the first location and the second location (e.g., the difference in the positions of the first location and the second location) indicates the relative depth of the first and second objects to one another and the positions of the first location and the second location indicate the absolute depth of the first and second objects.

In some examples, the further away an object is from optical transmitter 16 and optical receiver 20, the closer the received projected pattern or codeword is from its original position at optical receiver 20 (e.g., the outgoing projection and incoming projection are more parallel). Conversely, the closer an object is from optical transmitter 16 and optical receiver 20, the further the received projected pattern or codeword is from its original position at optical receiver 20. Thus, the difference between received and transmitted codeword position may be used as an indicator of the depth of an object. In one example, such depth (e.g., relative depth) may provide a depth value for objects depicted by each pixel or grouped pixels (e.g., regions of two or more pixels) in an image.

The pattern or codeword may be considered as including a plurality of elements, where the elements in the structured light together form the pattern or codeword. Each element in the structured light is located at a particular location at the time of transmission and then located at a particular location on optical receiver 20. Receiver device 18 may include a local memory that stores pattern or codewords used for depth map generation. A processing circuit of receiver device 18 compares the elements of the received pattern or codewords to those stored in the local memory to confirm that the received pattern or codeword is a valid pattern or codeword and determine the depth map.

For instance, and element in the structured light is located at a particular location as determined and the element received in the reflected structured light is located at a particular location. The processing circuit within the receiver device 18 then determines a disparity (e.g., difference) between the location of each element in the transmitted structured light and the received reflected structured light, and based on the disparity determines the depth map.

Optical transmitter 16 transmits the structured light along optical axis 22A that spreads to generate a projected field. For instance, optical axis 22A extends outward perpendicular to optical transmitter 16 and the structured light spreads along angle of view 17 relative to optical axis 22A. Optical receiver 20 similarly includes a capture field that spreads around optical axis 24 along angle of view 19. As one example, angle of view 17 is 60° and angle of view 19 is 53°, but other angles are contemplated.

As illustrated in FIG. 1A, the projection field and the capture field intersect and where the projection field and the capture field overlap sets the field of view overlap. If an object is in the field of view overlap, then the object receives the structured light and optical receiver 20 receives the reflected structured light. If an object is outside the field of view overlap, then the object does not receive the structured light because the object is only in the capture field and not in the projection field or optical receiver 20 does not receive the reflected structured light because the object is only in the projection field.

In some cases, an object may be in neither the projection field nor the capture field. For instance, if the object is closer than a near field of view, then the object may be neither in the projection field or the capture field. As illustrated in FIG. 1A, the projection field and the capture field intersect at a point that is a distance 12A away from device 10. Distance 12A may define the near field of view. In this case, an object closer than a distance 12A and in between optical transmitter 16 and optical receiver 20 may not be captured.

However, a user of device 10 may find it desirable to determine depth map for an image where the object is closer than a distance 12A As described above, designing device 10 so that the near field of view is closer than distance 12A may require extensive testing and a specialized number of component options because various characteristics of optical transmitter 16 and optical receiver 20 interplay with one another, limiting the number of available components that are usable to create a structured light system having the desired near field of view and also with minimal impact on the far field of view.

As illustrated in FIG. 1B, optical transmitter 16 is tiled or angled relative to optical receiver 20. For instance, optical transmitter 16 and optical receiver 20 are not oriented in the same direction (e.g., are not facing the same direction). Although optical transmitter 16 is illustrated as tilted relative to optical receiver 20, in general, one of optical transmitter 16 or optical receiver 20 is parallel with a face of device 10, and the other one of optical transmitter 16 or optical receiver 20 is tilted relative to the face of device 10. For example, optical transmitter and optical receiver 20 may both be on the back-face of device 10, where the front-face includes the interface with which the user interacts. Optical receiver 20 may be parallel with the back-face of device 10, and optical transmitter 16 may be tilted relative to the back-face of device 10, as illustrated in FIG. 1B. However, in some examples, optical transmitter 16 may be parallel with the back-face of device 10, and optical receiver 20 may be tilted relative to the back-face of device 10. In these examples, optical transmitter 16 may be considered tilted (angled) relative to optical receiver 20.

It may be possible for both optical receiver 20 and optical transmitter 16 to be angled relative to the back-face of device 10. For such examples, optical transmitter 16 may be tilted relative to optical receiver 20 because optical transmitter 16 and optical receiver 20 are not facing the some direction and/or the respective optical axes intersect.

Similar to FIG. 1A, optical transmitter 16 transmits the structured light that spreads at an angle of view 17 along optical axis 22B. Optical axis 22B is perpendicular to optical transmitter 16 like optical axis 22A in FIG. 1A. However, in FIG. 1B, optical axis 22B and optical axis 24 of optical receiver 20 intersect one another, unlike in FIG. 1A where optical axis 22A and optical axis 24 are parallel. Accordingly, in FIG. 1B, optical transmitter 16 is angled relative to optical receiver 20 so that transmitter optical axis 22B intersects receiver optical axis 24. The angle of tilt of optical transmitter 16 relative to optical receiver 20 is defined by angle of tilt 46 (e.g., angle formed by the intersection). Angle of tilt 46 may be approximately 1° to 2°, but other angles are contemplated.

In FIG. 1B, the projection field intersects the capture field at point 34 that is a distance 12B away from device 10. Distance 12B is less than distance 12A, and therefore, by tilting (angling) optical transmitter 16, the techniques described in this disclosure may make the near field of view closer to device 10 without needing to rely on specialized components and allowing use of a wide variety of optical component types.

However, tilting optical transmitter 16 results in extra computations for generating the depth map. For instance, the location where the reflected pattern or codeword would appear on optical receiver 20 in the example illustrated in FIG. 1B is different than the location where the reflected pattern or codeword would appear on optical receiver 20 in the example illustrated in FIG. 1A. Accordingly, receiver device 18 may scale the position of each element in the received reflection of the structured light based on an angle of tilt 46 and a focal length of optical receiver 20, as described in more detail.

In addition, the tilt between optical transmitter 16 and optical receiver 20 causes distortions in the reflected pattern or codeword. For instance, the reflected pattern that optical receiver 20 receives in FIG. 1B may be tilted relative to the reflected pattern that optical receiver 20 receives in FIG. 1A.

As described above, optical receiver 20 compares the reflected pattern to known patterns to confirm that the reflected pattern is valid. Because the reflected pattern is tilted, there could possibly be some errors in reconstructing the pattern or codeword. In some examples, the tilt may be minimal and therefore the errors are minimal and no corrective action is needed. In some examples, optical receiver 20 may compensate for the tilt. In some examples, the patterns or codewords stored in local memory of receiver device 18 are tilted based on angle of tilt 46, and therefore, receiver device 18 may be able to reconstruct the patterns or codewords with no errors.

The projection field is defined by lines 28 and 32 in FIG. 1B and the capture field is defined by lines 26 and 30 in FIG. 1B. The equation of line 28 is $z4=-x4 \cot(\phi1/2-\gamma)$, and the equation of line 32 is $z3=x3 \cot(\phi1/2+\gamma)$. The equation of line 26 is $z2=-(x2-B)\cot(\phi2/2)$, and the equation of line 30 is $z1=(x1-B)\cot(\phi2/2)$. In the above equations, $\phi1$ is the angle of view 17, $\phi2$ is the angle of view 19, $\gamma$ is the angle of tilt 46 (also referred to as yaw), and B is the distance between optical transmitter 16 and optical receiver 20. In the equations, x1, x2, x3, and x4 represent a coordinate value along respective lines from which z1, z2, z3, and z4 are determined.

The x1, x2, x3, and x4 can be seen as setting the field of view overlap. For instance, at point 34, the projection field and capture field first intersect. From point 34 to point 38, the field of view overlap is defined by lines 26 and 32, which can be represented as x3-x2, as illustrated by line 40. From point 38 to point 36, the field of view overlap is defined by lines 26 and 30, which can be represented as x1-x2, as illustrated by line 42. From point 36 and above, the field of view overlap is defined by lines 28 and 30, which can be represented as x1-x4, as illustrated by line 44.

The location of point 34 is $B/(\tan(\phi1/2+\gamma)+\tan(\phi2/2))(\tan(\phi1/2+\gamma),1)$. The location of point 38 is $B/(\tan(\phi1/2+\gamma)-\tan(\phi2/2))(\tan(\phi1/2+\gamma),1)$. The location of point 36 is $B/(\tan(\phi2/2)-\tan(\phi1/2-\gamma))(-\tan(\phi1/2-\gamma),1)$.

As illustrated in FIGS. 1A and 1B, distance 12B is less than distance 12A. Accordingly, by tilting optical transmitter 16 relative to optical receiver 20, the yaw can be exploited to reduce the location of the near field of view (e.g., bring the near field of view closer to device 10).

As described above, in example techniques, receiver device 18 may need to compensate for the yaw to determine the depth map. For example, a processing circuit of receiver device 18 may scale a position of each element in the received reflection of the structured light based on the angle of tilt $\gamma$ and a focal length of optical receiver 20. The processing circuit may then generate the depth map based on the scaled position of each element in the received reflection of the structured light, each element in the structured light that corresponds to a respective element in the received reflection of the structured light, the focal length of optical receiver 20, and a baseline distance (B) between optical transmitter 16 and optical receiver 20.

As an example, the processing circuit may implement the following equation:

$$Z=fB/(xT-f*((f \sin \gamma + xR \cos \gamma)/(f \cos \gamma - xR \sin \gamma))).$$

In the equation, Z is the depth map, f is the focal length of optical receiver 20, B is the distance between optical transmitter 16 and optical receiver 20, xT is a position of an element in the transmitted structured light, and xR is a position of the corresponding element in the received reflection of the structured light. For example, xT and xR are positions for the same element, but xT is the location at the time of transmission and xR is the location in the received reflection of the structured light.

The processing circuitry of receiver device 18 may implement the equation to determine the depth value (Z) for each element. For instance, $f^*((f \sin \gamma + xR \cos \gamma)/(f \cos \gamma - xR \sin \gamma))$ can be considered as the equation that the processing unit uses to scale a position of each element in the received reflection of the structured light (e.g., xR). The scaling is performed based on the angle of tilt γ and the focal length f. Also, in the equation, depth map is generated from the scaled position of each element in the received reflection of the structured light (e.g., xR), each element in the structured light (e.g., xT) that corresponds to a respective element in the received reflection of the structured light (e.g., xR), the focal length of optical receiver 20 (e.g., f), and a distance (e.g., baseline distance B) between optical transmitter 16 and optical receiver 20.

This disclosure describes intentionally tilting optical transmitter 16 to increase near field of view and to modify disparity calculation to accommodate known yaw. With the techniques described in this disclosure, there may be 5% gain in useful depth map size and the system components may be decoupled from the performance of depth map generation (e.g., allowing for many choices for the optical components). For example, the near field FOV generated by optical transmitter 16 and optical receiver 20 is closer to device 10 that includes optical transmitter 16 and optical receiver 20 as compared to the example of FIG. 1A where optical transmitter 16 is not angled relative to optical receiver 20 and the transmitter optical axis does not intersect the receiver optical axis.

As also described above, the tilt in optical transmitter 16 causes distortion in the received reflection of the structured map for purposes of pattern detection or codeword detection. In some examples, the projective distortion is handled in a grid detection algorithm which means that additional corrective actions to compensate for the tilt of optical transmitter 16 may not be needed. For example, as described above, the codewords that receiver device 18 stores may already be tiled based on known tilt angle, and therefore, when the processing circuit of receiver device 18 performs grid detection to determine the codewords, the processing circuit needs to perform no additional corrective action to compensate for the tilt of optical transmitter 16.

Figure 2:
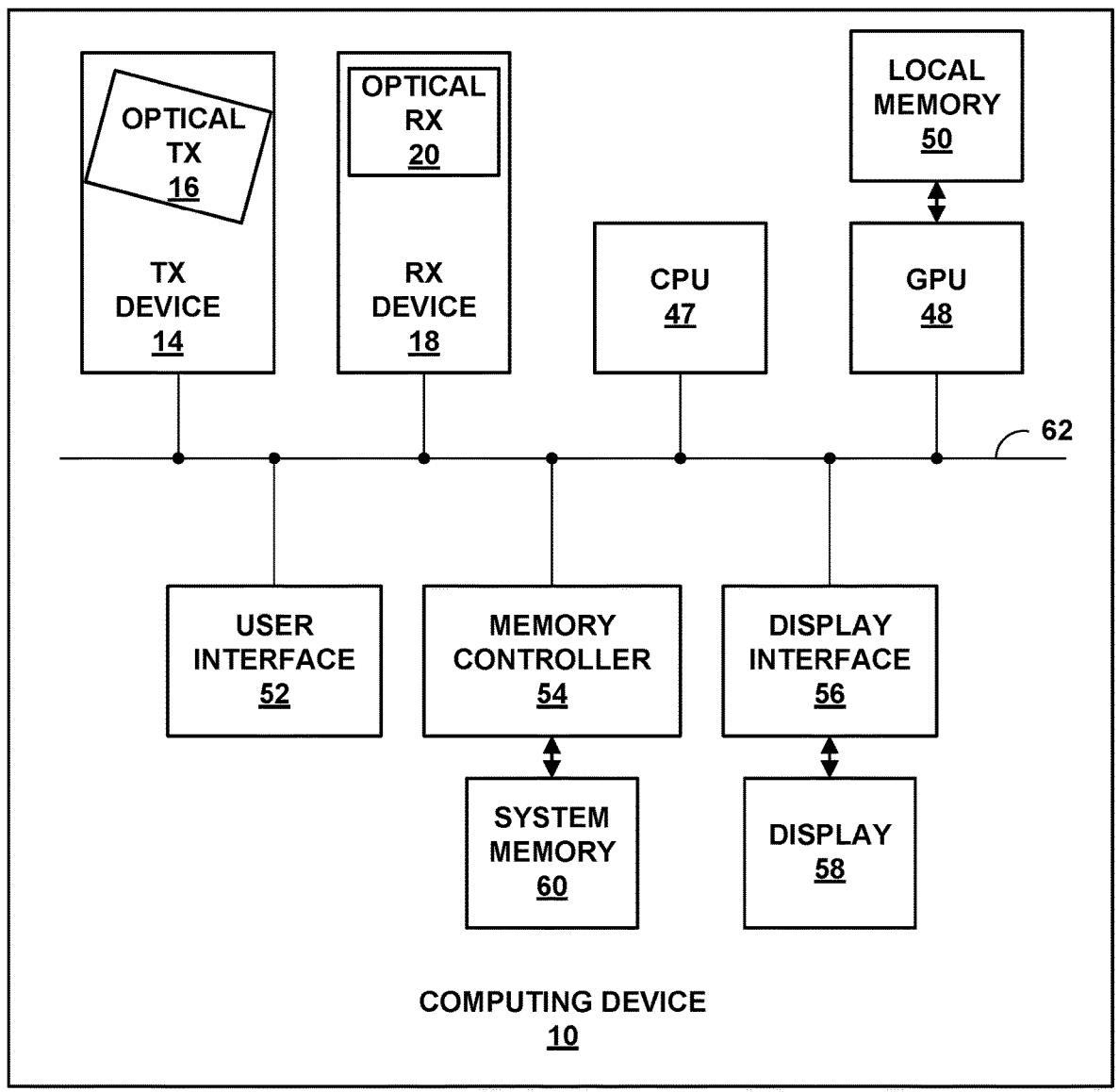
FIG. 2 is a block diagram of a device for image processing configured to perform one or more example techniques described in this disclosure.

FIG. 2 is a block diagram of a device for image processing configured to perform one or more example techniques described in this disclosure. FIG. 2 illustrates device 10 in more detail. As described above, examples of device 10 include a personal computer, a desktop computer, a laptop computer, a computer workstation, a video game platform or console, a wireless communication device (such as, e.g., a mobile telephone, a cellular telephone, a table computer, a satellite telephone, and/or a mobile telephone handset), a landline telephone, an Internet telephone, a handheld device such as a portable video game device or a personal digital assistant (PDA), a personal music player, a video player, a display device, a camera, a television, a television set-top box, a server, an intermediate network device, a mainframe computer or any other type of device that processes and/or displays graphical data.

As illustrated in the example of FIG. 2, device 10 includes transmitter device 14 that includes optical transmitter 16, receiver device 18 that includes optical receiver 20, a central processing circuit (CPU) 45, a graphical processing circuit (GPU) 48 and local memory 50 of GPU 48, user interface 52, memory controller 54 that provides access to system memory 60, and display interface 56 that outputs signals that cause graphical data to be displayed on display 58.

Transmitter device 14 and receiver device 18 are similar to those described above with respect to FIGS. 1A and 1B and are not described further. However, in some examples, receiver device 18 may also function as a camera for device 10, and in such examples, receiver device 18 may be used for depth map generation and for capturing photographic images or device 10 may include a separate camera to capture photographic images. In this disclosure, receiver device 18 is described as being used for both generating the depth map and capturing photographic images. The processing circuit of receiver device 18 may function as a camera processor as well.

Also, although the various components are illustrated as separate components, in some examples the components may be combined to form a system on chip (SoC). As an example, the processing circuit of receiver device 18 may be formed with one or more of CPU 45, GPU 48, and display interface 56. In such examples, optical receiver 20 may be separate from receiver device 18. Furthermore, the examples described above with respect to the processing circuit of receiver device 18 generating the depth map are provided merely to ease understanding. In some examples, CPU 45, GPU 48, or some other device may be configured to perform the examples described above for the processing circuit of receiver device 18.

The various components illustrated in FIG. 2 may be formed in one or more microprocessors, application specific integrated circuits (ASICs), field programmable gate arrays (FPGAs), digital signal processors (DSPs), or other equivalent integrated or discrete logic circuitry. Also, transmitter device 14 and receiver device 18 may include local memory for storage of data such as patterns or codewords. Examples of such local memory include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 2 communicate with each other using bus 62. Bus 62 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 2 is merely exemplary, and other configurations of computing devices and/or other image processing systems with the same or different components may be used to implement the techniques of this disclosure.

CPU 45 may comprise a general-purpose or a special-purpose processor that controls operation of device 10. A user may provide input to computing device 10 to cause CPU 45 to execute one or more software applications. The software applications that execute on CPU 45 may include, for example, an operating system, a word processor application, an email application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 52.

As one example, the user may execute an application that generates graphical data for stereoscopic images. The application may use images captured by optical receiver 20. In such examples, transmitter device 14 and receiver device 18 may together perform the example techniques described in this disclosure to generate a depth map. The application executing on CPU 45 may use the depth map and the captured images.

For instance, CPU 45 may transmit instructions and data to GPU 48 to render graphical images. In such examples, the application executing on CPU 45 may transmit instructions, the depth map, and other data to GPU 48 instructing GPU 48 to generate stereoscopic images. For example, GPU 48 includes a plurality of parallel pipelines which are a combination of fixed-function circuits and programmable circuits, and GPU 48 processes pixels through the parallel pipelines to generate the stereoscopic images.

Memory controller 54 facilitates the transfer of data going into and out of system memory 60. For example, memory controller 54 may receive memory read and write commands, and service such commands with respect to memory 60 in order to provide memory services for the components in computing device 10. Memory controller 54 is communicatively coupled to system memory 60. Although memory controller 54 is illustrated in the example computing device 10 of FIG. 2 as being a processing module that is separate from both CPU 45 and system memory 60, in other examples, some or all of the functionality of memory controller 54 may be implemented on one or both of CPU 45 and system memory 60.

System memory 60 may store program modules and/or instructions and/or data that are accessible by transmitter device 14, receiver device 18, CPU 45, and GPU 48. For example, system memory 60 may store user applications and graphics data associated with the applications. System memory 60 may additionally store information for use by and/or generated by other components of computing device 10. For example, system memory 60 may act as a device memory for transmitter device 14 and receiver device 18 (e.g., device memory for the camera processor of receiver device 18). System memory 60 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 60 may include instructions that cause transmitter device 14, receiver device 18, CPU 45, GPU 48, and display interface 56 to perform the functions ascribed in this disclosure to transmitter device 14, receiver device 18, CPU 45, GPU 48, and display interface 56. Accordingly, system memory 60 may be a computer-readable storage medium having instructions stored thereon that, when executed, cause one or more processors (e.g., processing circuits of transmitter device 14 and/or receiver device 18 and CPU 45, GPU 48, and display interface 56) to perform various functions.

In some examples, system memory 60 is a non-transitory storage medium. The term "non-transitory" indicates that the storage medium is not embodied in a carrier wave or a propagated signal. However, the term "non-transitory" should not be interpreted to mean that system memory 60 is non-movable or that its contents are static. As one example, system memory 60 may be removed from device 10, and moved to another device. As another example, memory, substantially similar to system memory 60, may be inserted into device 10. In certain examples, a non-transitory storage medium may store data that can, over time, change (e.g., in RAM).

Receiver device 18, CPU 45, and GPU 48 may store depth maps, image data, rendered image data, and the like in respective buffers that is allocated within system memory 60. Display interface 56 may retrieve the data from system memory 60 and configure display 58 to display the image represented by the rendered image data. In some examples, display interface 56 may include a digital-to-analog converter (DAC) that is configured to convert the digital values retrieved from system memory 60 into an analog signal consumable by display 58. In other examples, display interface 56 may pass the digital values directly to display 58 for processing.

Display 58 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 58 may be integrated within computing device 10. For instance, display 58 may be a screen of a mobile telephone handset or a tablet computer. Alternatively, display 58 may be a stand-alone device coupled to computing device 10 via a wired or wireless communications link. For instance, display 58 may be a computer monitor or flat panel display connected to a personal computer via a cable or wireless link.

Figure 3:
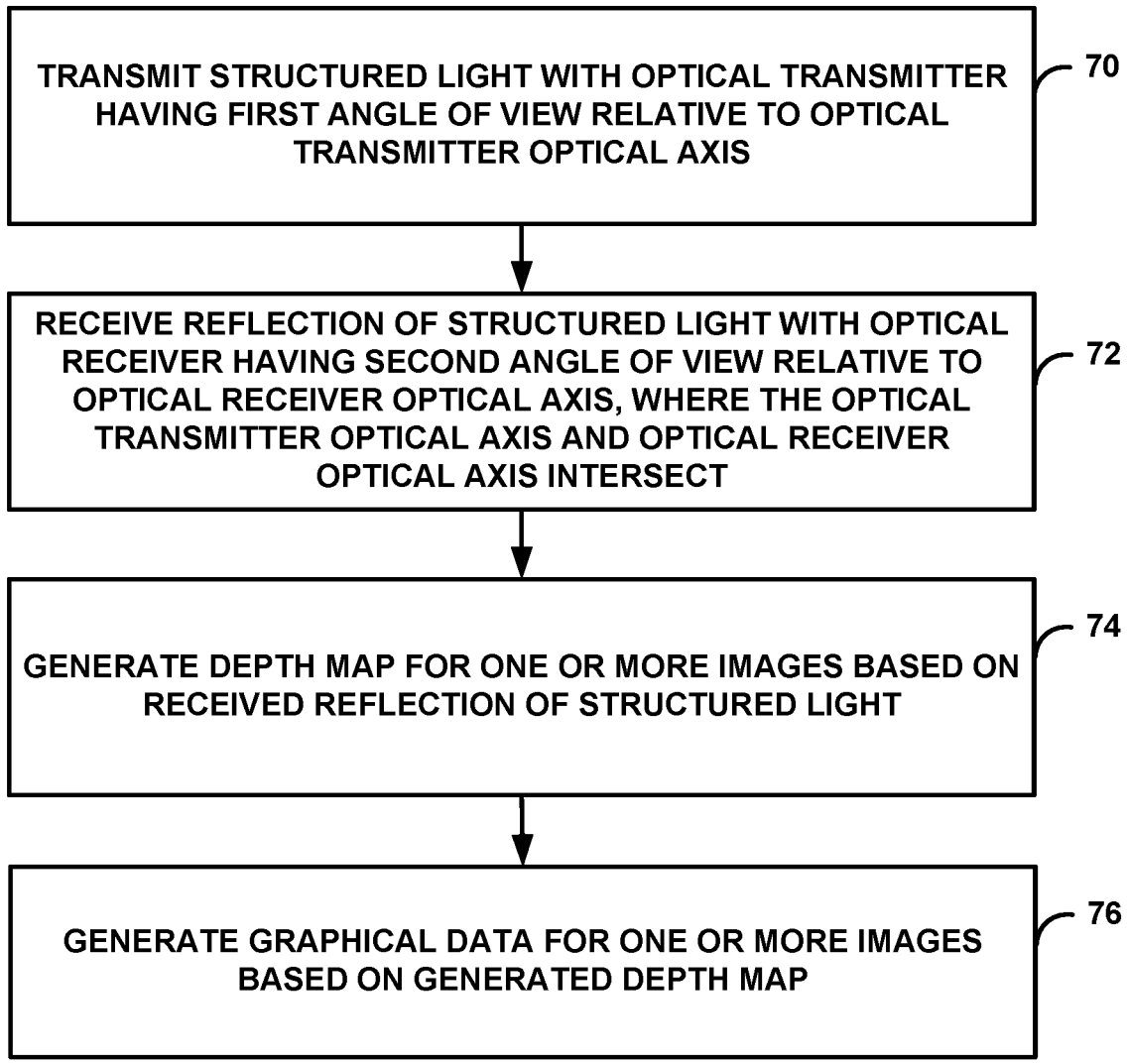
FIG. 3 is a flow chart of a method of image processing for performing one or more example techniques described in this disclosure.

FIG. 3 is a flow chart of a method of image processing for performing one or more example techniques described in this disclosure. The image processing may be for generating a depth map of an object, which can then be used to generate stereoscopic images that provide the viewer with a perception of depth.

As illustrated, transmitter device 14 via optical transmitter 16 may transmit structured light, optical transmitter 16 having (e.g., defining) a first angle of view 17 relative to transmitter optical axis 22B (70). Transmitting the structured light may include transmitting a pattern via the structured light. Receiver device 18, via optical receiver 20, may receive a reflection of the structured light, optical receiver 20 having (e.g., defining) a second angle of view 19 relative to receiver optical axis 24 (72). Receiving the reflection of the structured light may include receiving a distorted pattern via the reflection.

Receiver device 18 via a processing circuit of receiver device 18 may generate a depth map for one or more images based on the received reflection of the structured light (74). For example, processing circuitry of receiver device 18 may perform the operations of the equation for Z, where $Z=fB/(xT-f^*((f \sin \gamma + xR \cos \gamma)/(f \cos \gamma - xR \sin \gamma)))$. The processing circuitry of receiver device 18 may perform the operations of the equation to determine the depth value (Z) for each received element. As described above, the equation for Z represents the scaling used to compensate for the angle of tilt. The scaling is performed based on the angle of tilt $\gamma$ and the focal length f. Also, in the equation, depth map is generated from scaled position of each element in the received reflection of the structured light (e.g., xR), each element in the structured light (e.g., xT) that corresponds to a respective element in the received reflection of the structured light (e.g., xR), the focal length of optical receiver 20 (e.g., f), and a distance (e.g., baseline distance B) between optical transmitter 16 and optical receiver 20.

GPU 48 may generate graphical data for the one or more images based on the generated depth map (76). For example, the depth map indicates relative distances of objects from device 10. GPU 48 may generate a first image and a second image, where the first image and the second image include substantially similar content. However, there is horizontal disparity between the content. As one example, GPU 48 may determine the amount of horizontal disparity to add to objects in the first and second image so that the viewer perceives the object at the distance indicated with the depth map when the viewer views both the first and second image together.

For example, from testing and based on the size of display 58, a manufacturer may determine the distance away from device 10 that a viewer perceives an object for a given disparity between a first and a second image. Based on the relationship between disparity in the images and distance that the viewer perceives an image, the manufacturer or a computer model may extract a relationship between disparity and depth (e.g., distance away from device 10). GPU 48 or some other unit of device 10 may store this relationship information and based on depth map determined via the example techniques, determine the disparity in the objects in the two images, and GPU 48 render the images to have the determined disparity in the objects.

As another example, GPU 48 or some other unit of device 10 may store a look-up table that associates disparity between objects in the first and second images and depth. Based on the determined depth from the depth map and the look-up table, GPU 48 or some other unit determines the disparity between the objects in the first and second images (e.g., the position of the objects in the first and second images). GPU 48 renders the image to have the determined disparity in the objects based on the determined positions of the objects in the first and second images.

The previous examples provided two example algorithms to generate graphical data for the one or more images based on the generated depth map. However, other example techniques are possible and the examples should not be considered limited to the above examples.

In some examples, receiver device 18 may determine whether the received distorted pattern corresponds to the transmitted pattern without compensating for an angle of tilt γ of optical transmitter 16 relative to optical receiver 20. Receiver device 18 may determine a location of where the distorted pattern is received by optical receiver 20, and generate the depth map based on the location of where the distorted pattern is received by optical receiver 20 and the angle of tilt γ of optical transmitter 16 relative to optical receiver 20.

In some examples, to generate the depth map, receiver device 18 may scale a position of each element in the received reflection of the structured light based on an angle of tilt γ of optical transmitter 16 relative to optical receiver 20 and a focal length (f) of optical receiver 20. Receiver device 18 may generate the depth map based on the scaled position of each element in the received reflection of the structured light, each element in the structured light that corresponds to a respective element in the received reflection of the structured light, the focal length of optical receiver 20, and a distance between optical transmitter 16 and optical receiver 20 (e.g., baseline distance B).

Figure 4:
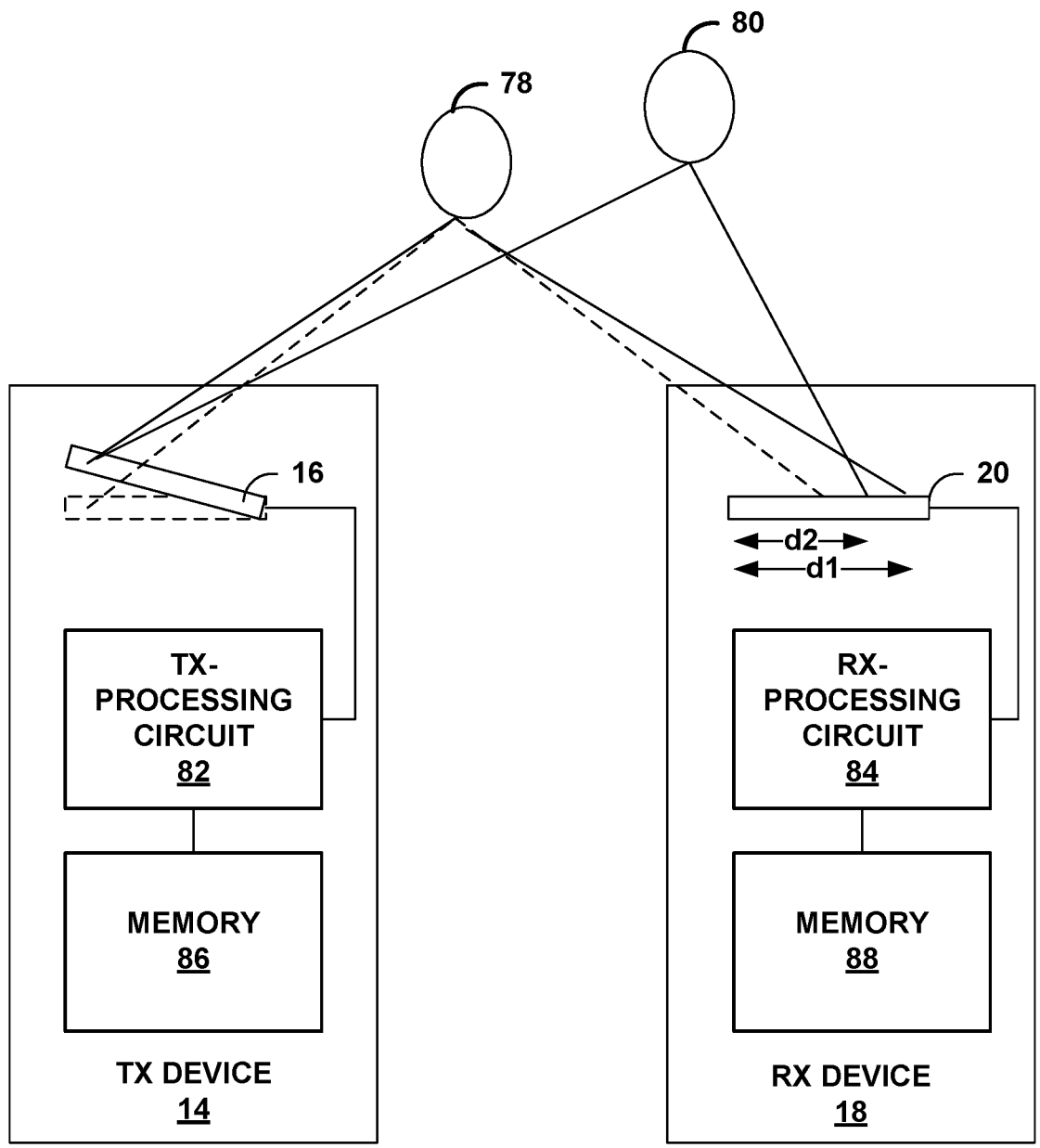
FIG. 4 is a block diagram illustrating a transmitter device and a receiver device of FIG. 2 in greater detail.

FIG. 4 is a block diagram illustrating a transmitter device and a receiver device of FIG. 2 in greater detail. FIG. 4 illustrates two positions for optical transmitter 16. In dashes, optical transmitter 16 is not tilted and its transmitter optical axis is parallel with the receiver optical axis of optical receiver 20 (e.g., similar to FIG. 1A). In solid line, optical transmitter 16 is tilted and its transmitter optical axis intersects with the receiver optical axis of optical receiver 20 (e.g., similar to FIG. 1B).

FIG. 4 also illustrates objects 78 and 80, which are each objects from which the structured light that optical transmitter 16 transmits is reflected to optical receiver 20. In the example techniques, TX-processing circuit 82 may receive a codeword from memory 86 and cause optical transmitter 16 to transmit a structured light having that codeword. This structured light would reflect off of object 78 and object 80 onto optical receiver 20. RX-processing circuit 84 may convert the received structured light into a codeword, and compare the converted codeword to codewords stored in memory 88 to confirm that the received light actually includes a recognized codeword and is not ambient light. For the structured light, RX-processing circuit 84 may also determine where the codeword of the structured light was captured on optical receiver 20, and based on the position of the received codeword determine the depth of objects 78 and 80.

Prior to describing the operations to determine the depth, the following provides additional explanation of tilting and compensation that may be performed. In FIG. 4, a dashed line is illustrated as being outputted by the non-tilted example of optical transmitter 16 (dashed version), which then bounces off of object 78, and reflects to about the middle of optical receiver 20. Also, one solid line is illustrated as being outputted by the tilted version of optical transmitter 16 (solid version), which then bounces off of object 78, and reflects to near the end of optical receiver 20.

As illustrated, the position to where the structured light reflects on optical receiver 20 is different for the tilted version of optical transmitter 16 than it is for the non-tilted version of optical transmitter 16. Therefore, without compensation, RX-processing circuit 84 may determine different depths for object 78 for the tilted version of optical transmitter 16 and the non-tilted version of optical transmitter 16. Accordingly, for purposes of determining the depth map, RX-processing circuit 84 may perform the yaw compensation (e.g., $Z=fB/(xT-f*((f \sin \gamma + xR \cos \gamma)/(f \cos \gamma - xR \sin \gamma))))$, as described above.

Referring to an example algorithm for determining the respective depths, as illustrated, a first solid line illustrated as being transmitted by tilted optical transmitter 16 reflects off of object 78 onto optical receiver 20 at a distance d1 away from the left edge of optical receiver 20. A second solid line illustrated as being transmitted by tilted optical transmitter 16 reflects off of object 80 onto optical receiver 20 at a distance d2 away from the left edge of optical receiver 20. RX-processing circuit 84 may determine a depth of object 78 and 80 based on distances d1 and d2, respectively. For instance, objects that are closer to device 10 tend to reflect further from the edge of optical receiver 20 than objects that are further away from device 10. As illustrated, object 80 is further away than object 78. Therefore, distance d1, which is from the reflection of object 78, is further away from the edge of optical receiver 20 than distance d2, which is from the reflection of object 80.

In one or more example techniques, the position of optical transmitter 16 is constant relative to receiver device 18 (e.g., their respective positions are fixed and not moving relative to one another). Rather than having optical transmitter 16 output optical signals in a scanning pattern on an object, and having optical receiver 20 receive such a scanning pattern, optical transmitter 16 may be fixed in a constant position relative to optical receiver 20. The transmitter optical axis and the receiver optical axis may always intersect at the same point such that the angle γ does not change during the generation of the depth map.

Also, the structured light transmitted with optical transmitter 16 may be the same during the entire generation of the depth map by RX-processing circuit 84. TX-processing circuit 82 may output a structure light having a particular pattern, and from the reflection of that pattern, RX-processing circuit 84 may generate a depth map. There may be one structured light pattern that is transmitted and received, and from this one structured light pattern, RX-processing circuit 84 may determine the depth map.

Figure 5:
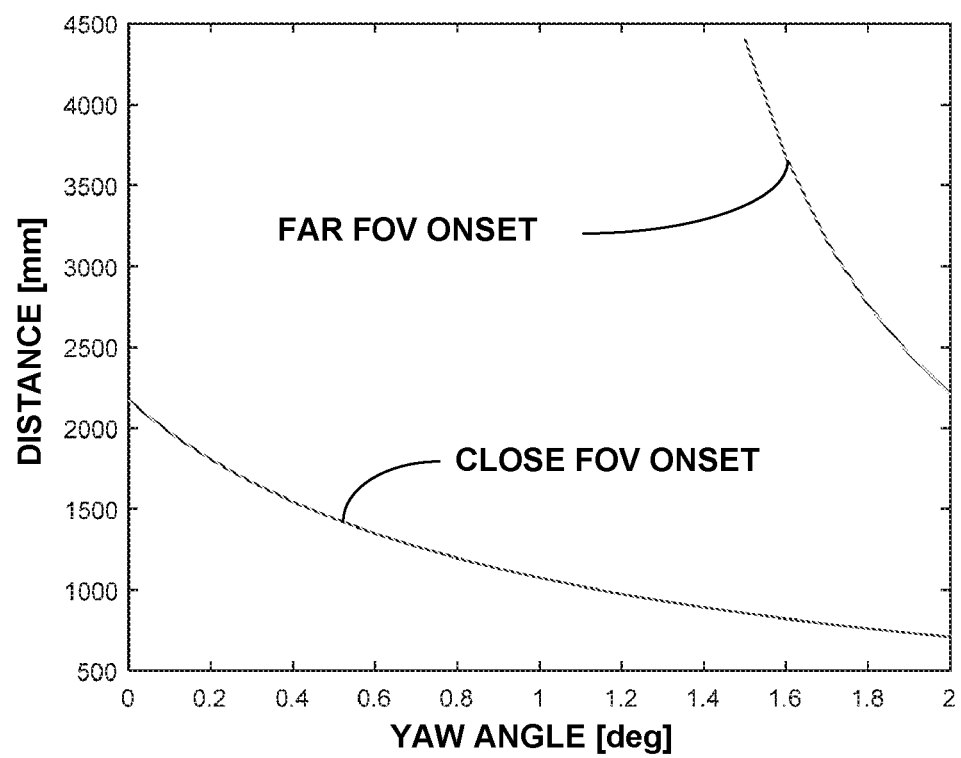
FIG. 5 is a graph illustrating the onset of the near field of view and far field of view as a function of yaw.

FIG. 5 is a graph illustrating the onset of the near field of view and far field of view as a function of yaw. In FIG. 5, the bottom line illustrates where the distance of the near field of view overlaps as a function of the angle of tilt γ, and the top line illustrates where the distance of the far field of view overlaps as a function of the angle of tilt γ.

As illustrated by the bottom line in FIG. 5, as the angle of tilt γ increases, the near field of view becomes closer to device 10, but the far field of view also comes in closer. For example, referring back to FIG. 1B, as the angle of tilt γ increases, point 34 comes closer to device 10 (e.g., distance 12B decreases). However, as indicated by the top line in FIG. 5, the increase in the angle of tilt γ also causes the far field to move closer to device 10. For example, referring back to FIG. 1B, as the angle of tilt γ increases, point 36 moves down line 26 and closer to device 10. Therefore, there is a balance in how much to set the angle of tilt γ based on design for where the near field and far field should be.

Figure 6A:
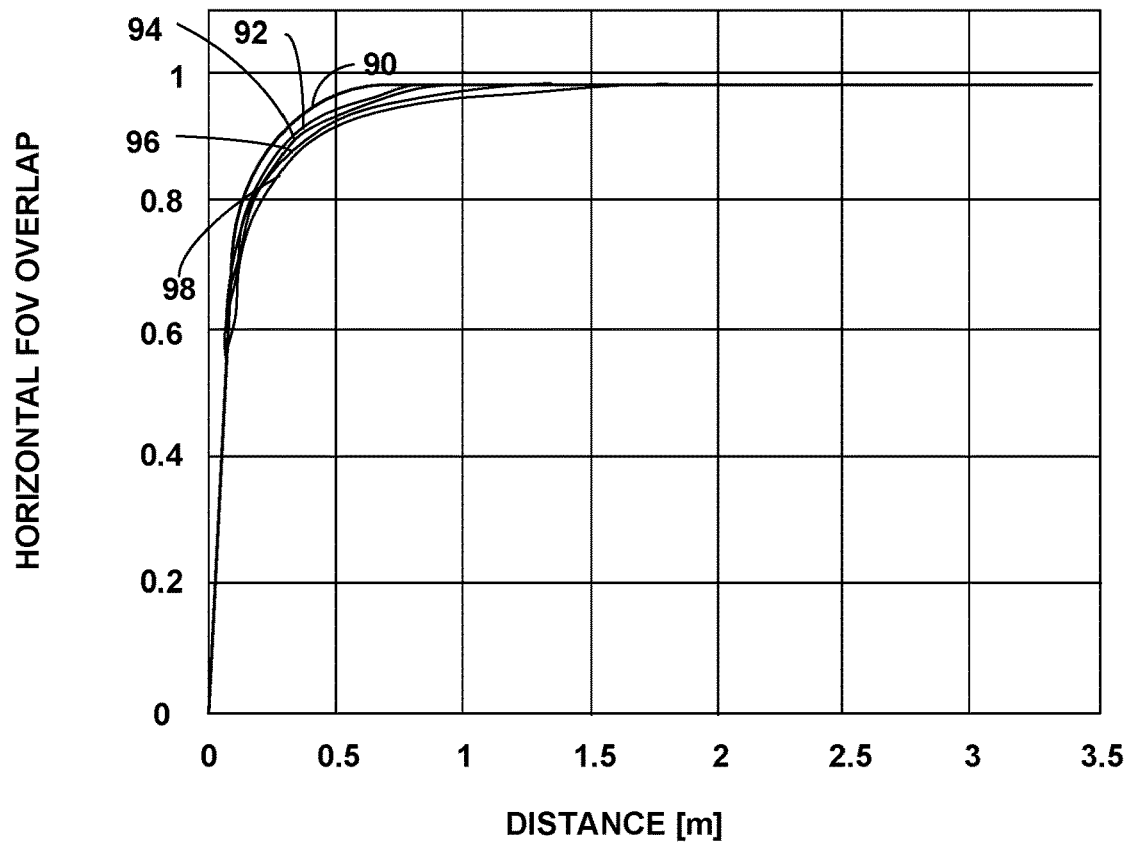
FIGS. 6A and 6B are graphs illustrating the increase in the near range field of view overlap.
Figure 6B:
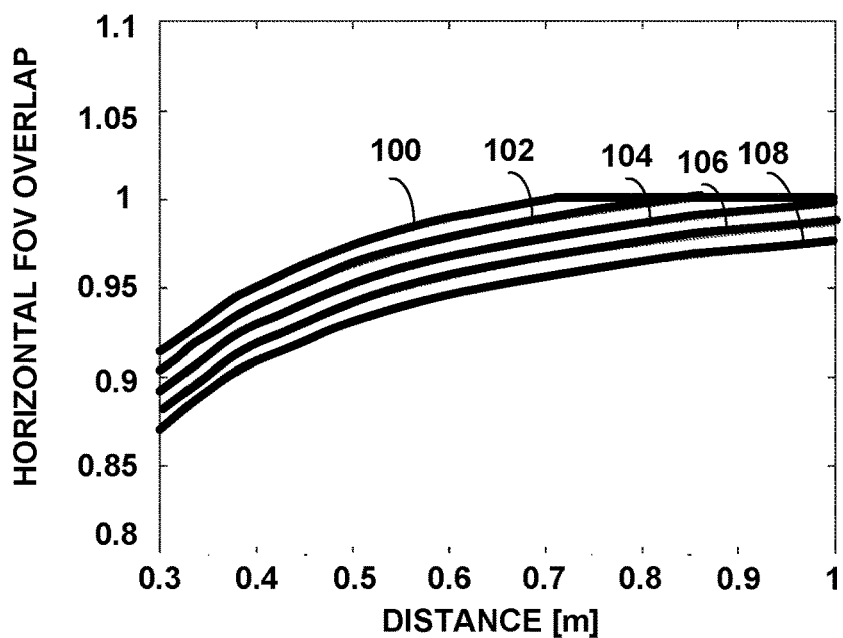

FIGS. 6A and 6B are graphs illustrating the increase in the near range field of view overlap. FIGS. 6A and 6B illustrate the horizontal overlap of the field of view for different yaw angles γ. The top line 90 is for 2° yaw angle, then line 92 is for 1.5° angle, then line 94 is for 1° angle, then line 96 is for 0.5°, and then line 98 is for 0°. FIG. 6B is a zoomed version of FIG. 6A showing the separation for the different yaw angles γ. For example, line 100 in FIG. 6B corresponds to line 90 in FIG. 6A, line 102 in FIG. 6B corresponds to line 92 in FIG. 6A, line 104 in FIG. 6B corresponds to line 94 in FIG. 6A, line 106 in FIG. 6B corresponds to line 96 in FIG. 6A, and line 108 in FIG. 6B corresponds to line 108 in FIG. 6A. In general, increasing the yaw increases close range field of view overlap. At sufficiently large range, the yaw causes reduced field of view.

Figure 7A:
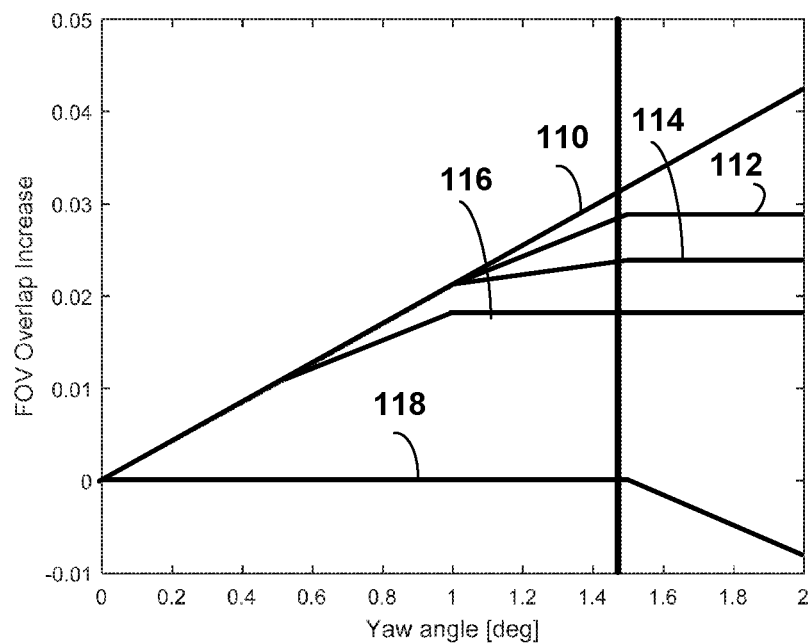
FIGS. 7A and 7B are graphs illustrating the increase in near range field of view overlap as a function of yaw and distance.
Figure 7B:
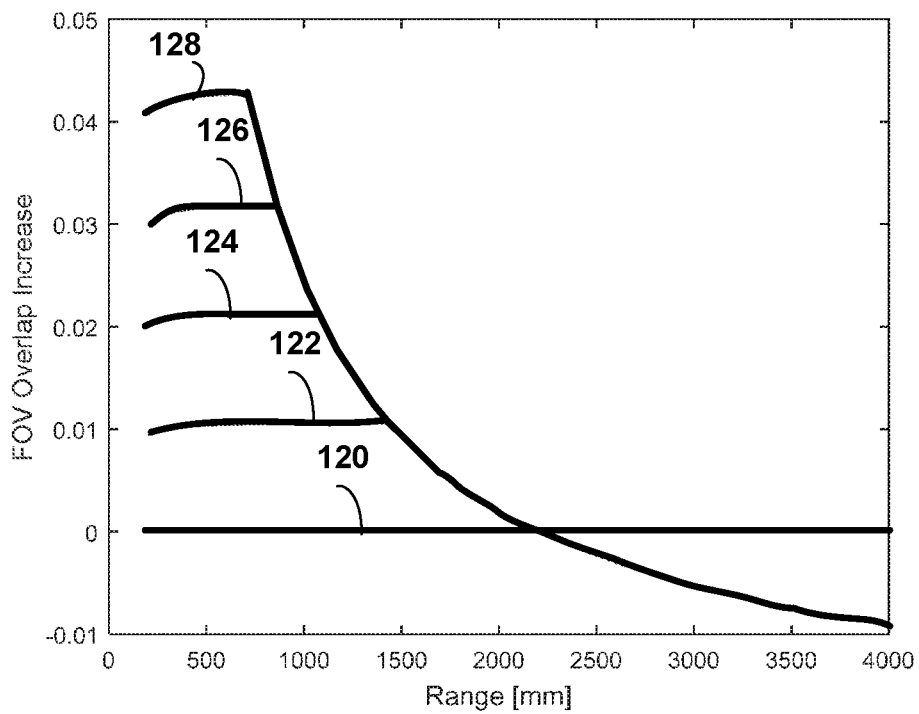

FIGS. 7A and 7B are graphs illustrating the increase in near range field of view overlap as a function of yaw and distance. In FIGS. 7A and 7B, the y-axis is the field of view overlap increase. In FIG. 7A, the x-axis is the yaw angle γ, and in FIG. 7B, the x-axis is distance. For instance, in FIG. 7A, the graph is drawn for different distances, with the bottom line 118 being for 3.5 m, the next one above (line 116) for 1 m, above that line (line 114) for 0.85 m, above that line (line 112) for 0.75 m, and above that line (line 110) for 0.5 m. In FIG. 7A, a yaw angle of 1.5° is illustrated to illustrate an example yaw angle that may maximize short range FOV overlap gain for an object at distance 3.5 m. In FIG. 7B, the graph is drawn for different yaw angles γ. The top line 128 is for 2°, the next one below (line 126) is for 1.5°, the next one below (line 124) is for 1°, the next one below (line 122) is for 0.5°, and the next one below (line 120) is for 0°.

In the example techniques described in this disclosure, the near range field of view (e.g., near field FOV) may be closer to device 10, as compared to other examples. For instance, the near field FOV generated by optical transmitter 16 and optical receiver 20 is closer to device 10 as compared to if optical transmitter 16 is not angled relative to optical receiver 20 and the transmitter optical axis does not intersect the receiver optical axis.

Figure 8:
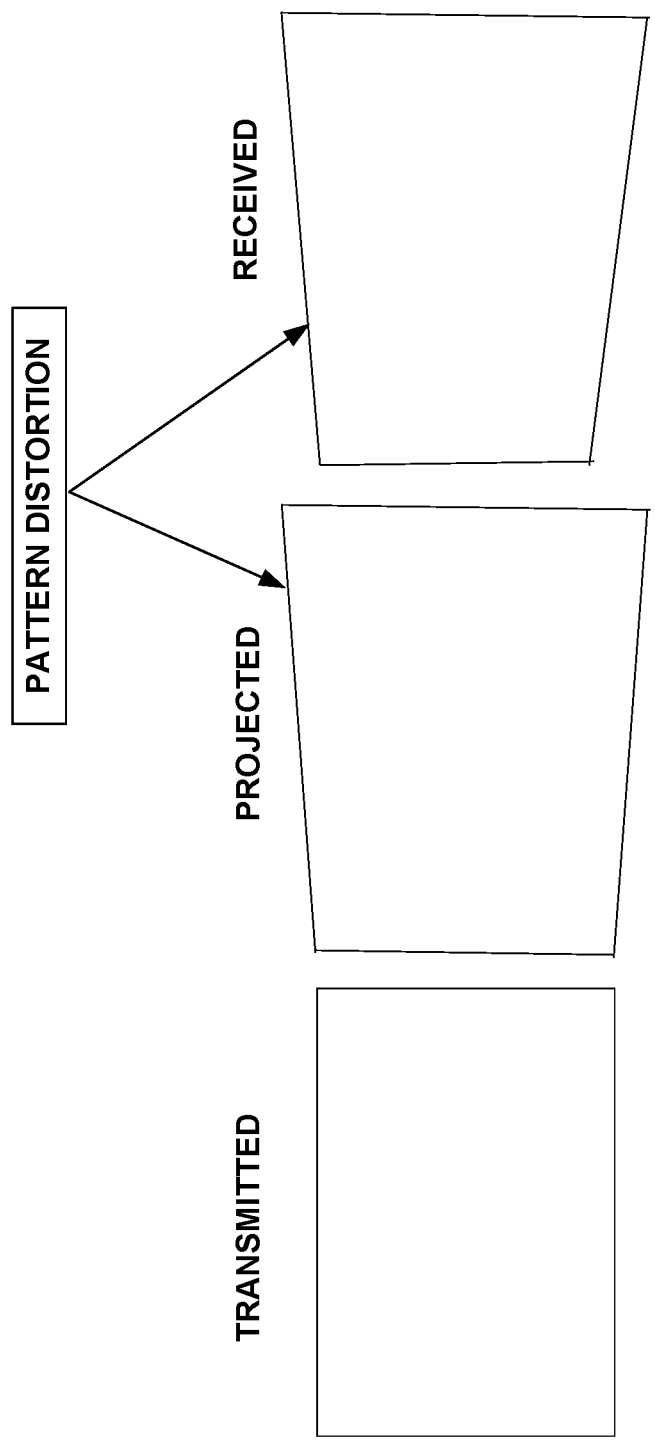
FIG. 8 is a graph illustrating pattern distortion.

FIG. 8 is a graph illustrating pattern distortion. For instance, in FIG. 8, the far left illustrates the transmitted pattern, but the reflected and received patterns are distorted due to the angle of tilt γ (e.g., the received pattern is slightly tilted relative to the reflected pattern). In general, the pattern distortion due to yaw is negligible for small tilting angles. Receiver device 18 may accommodate the pattern distortion within a grid detection scheme for pattern detection. For example, as described above, RX-processing circuit 84 may need to detect the pattern from the structured light based on codewords stored in memory 88. If there is distortion, then RX-processing circuit 84 may need to perform pattern distortion compensation. One way of such pattern distortion compensation is to pre-distort the codewords stored in memory 88 based on the known yaw, and therefore RX-processing circuit 84 may perform pattern detection without errors. In other words, since the yaw angle is known, the distortion field can be pre-computed, and for high precision applications, the distortion can be compensated with no loss in accuracy. However, in some cases, the distortion caused by the tilting of optical transmitter 16 may be relatively minimal, meaning that additional compensation by RX-processing circuit 84 is not needed.

In one or more examples, the functions described may be implemented in hardware, software, firmware, or any combination thereof. If implemented in software, the functions may be stored on, as one or more instructions or code, a computer-readable medium and executed by a hardware-based processing circuit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of image processing, the method comprising:
transmitting structured light, with an optical transmitter, the optical transmitter having a first angle of view relative to a transmitter optical axis;
receiving, with an optical receiver, a reflection of the structured light, the optical receiver having a second angle of view relative to a receiver optical axis, wherein the optical transmitter is angled relative to the optical receiver so that the transmitter optical axis intersects the receiver optical axis forming an angle therebetween, and wherein a position of the optical transmitter relative to the optical receiver is constant;
scaling, with processing circuitry, a position of an element in the received reflection of the structured light that is received at the optical receiver, wherein scaling the position of the element in the received reflection comprises scaling the position of the element in the received reflection based on the angle of the optical transmitter relative to the optical receiver and a focal length of the optical receiver, and wherein the position of the element in the received reflection corresponds to a position of the element in the transmitted structured light; and
generating a depth map for one or more images based at least on the scaled reflection.

2. The method of claim 1, wherein the structured light transmitted with the optical transmitter is the same during the entire generation of the depth map.

3. The method of claim 1, wherein generating the depth map comprises generating the depth map based on the scaled reflection, each element in the structured light that corresponds to a respective element in the received reflection of the structured light, the focal length of the optical receiver, and a distance between the optical transmitter and the optical receiver.

4. The method of claim 1, wherein transmitting the structured light comprises transmitting a pattern via the structured light, wherein receiving the reflection of the structured light comprises receiving a distorted pattern via the reflection, the method further comprising:
determining whether the received distorted pattern corresponds to the transmitted pattern without compensating for the angle of the optical transmitter relative to the optical receiver.

5. The method of claim 4, further comprising:
determining a location of where the distorted pattern is received by the optical receiver,
wherein generating the depth map comprises generating the depth map based on the location of where the distorted pattern is received by the optical receiver and the angle of the optical transmitter relative to the optical receiver.

6. The method of claim 1, further comprising:
receiving the generated depth map; and
generating graphical data for the one or more images based on the generated depth map.

7. The method of claim 1, wherein a device includes the optical transmitter and the optical receiver, wherein one of the optical transmitter or the optical receiver is parallel with a face of the device, and the other one of the optical transmitter or the optical receiver is tilted relative to the face of the device.

8. The method of claim 1, wherein a near field of view (FOV) generated by the optical transmitter and the optical receiver is closer to a device that includes the optical transmitter and the optical receiver as compared to if the optical transmitter is not angled relative to the optical receiver and the transmitter optical axis does not intersect the receiver optical axis.

9. A device for image processing, the device comprising:
an optical transmitter configured to transmit structured light, the optical transmitter having a first angle of view relative to a transmitter optical axis;
an optical receiver configured to receive a reflection of the structured light, the receiver having a second angle of view relative to a receiver optical axis, wherein the optical transmitter is angled relative to the optical receiver so that the transmitter optical axis intersects the receiver optical axis forming an angle therebetween, and wherein a position of the optical transmitter relative to the optical receiver is constant; and
a processing circuit configured to:
scale a position of an element in the received reflection of the structured light that is received at the optical receiver, wherein to scale the position of the element in the received reflection, the processing circuit is configured to scale the position of the element in the received reflection based on the angle of the optical transmitter relative to the optical receiver and a focal length of the optical receiver, and wherein the position of the element in the received reflection corresponds to a position of the element in the transmitted structured light; and
generate a depth map for one or more images based at least on the scaled reflection.

10. The device of claim 9, wherein the optical transmitter transmits the same structured light during the entire generation of the depth map.

11. The device of claim 9, wherein to generate the depth map, the processing circuit is configured to generate the depth map based on the scaled reflection, each element in the structured light that corresponds to a respective element in the received reflection of the structured light, the focal length of the optical receiver, and a distance between the optical transmitter and the optical receiver.

12. The device of claim 9, wherein the optical transmitter is configured to transmit a pattern via the structured light, wherein the optical receiver is configured to receive a distorted pattern via the reflection, wherein the processing circuit is configured to determine whether the received distorted pattern corresponds to the transmitted pattern without compensating for the angle of the optical transmitter relative to the optical receiver.

13. The device of claim 12, wherein the processing circuit is configured to determine a location of where the distorted pattern is received by the optical receiver, and wherein to generated the depth map, the processing circuit is configured to generate the depth map based on the location of where the distorted pattern is received by the optical receiver and the angle of the optical transmitter relative to the optical receiver.

14. The device of claim 9, wherein the processing circuit comprises a first processing circuit, the device further comprising a second processing circuit configured to:
receive the generated depth map from the first processing circuit; and
generate graphical data for the one or more images based on the generated depth map.

15. The device of claim 14, wherein the first processing circuit and the second processing circuit are the same processing circuit.

16. The device of claim 9, wherein the device comprises one of:
a wireless communication device, a laptop, a desktop, a tablet, a camera, and a video gaming console.

17. The device of claim 9, wherein one of the optical transmitter or the optical receiver is parallel with a face of the device, and the other one of the optical transmitter or the optical receiver is tilted relative to the face of the device.

18. The device of claim 9, wherein a near field of view (FOV) generated by the optical transmitter and the optical receiver is closer to the device that includes the optical transmitter and the optical receiver as compared to if the optical transmitter is not angled relative to the optical receiver and the transmitter optical axis does not intersect the receiver optical axis.

19. A computer-readable storage medium including instructions stored thereon that when executed cause one or more processors of a device for image processing to:
cause an optical transmitter of the device to transmit structured light, the optical transmitter having a first angle of view relative to a transmitter optical axis, wherein the optical transmitter is angled relative to an optical receiver of the device so that the transmitter optical axis intersects a receiver optical axis forming an angle therebetween, and wherein a position of the optical transmitter relative to the optical receiver is constant;
scale a position of an element in a received reflection of the structured light that is received at the optical receiver, wherein the instruction that cause the one or more processors to scale the position of the element in the received reflection comprise instructions that cause the one or more processors to scale the position of the element in the received reflection based on the angle of the optical transmitter relative to the optical receiver and a focal length of the optical receiver, and wherein the position of the element in the received reflection corresponds to a position of the element in the transmitted structured light; and
generate a depth map for one or more images based at least on the scaled reflection, wherein the received reflection is received by the optical receiver, the optical receiver having a second angle of view relative to the receiver optical axis.

20. The computer-readable storage medium of claim 19, wherein the structured light transmitted with the optical transmitter is the same during the entire generation of the depth map.

21. A device for image processing, the device comprising:
means for transmitting structured light, the means for transmitting having a first angle of view relative to a transmitter optical axis;
means for receiving a reflection of the structured light, the means for receiving having a second angle of view relative to a receiver optical axis, wherein the means for transmitting is angled relative to the means for receiving so that the transmitter optical axis intersects the receiver optical axis forming an angle therebetween, and wherein a position of the means for transmitting is constant relative to the means for receiving;
means for scaling a position of an element in the received reflection of the structured light that is received at the optical receiver, wherein the means for scaling the position of the element in the received reflection comprises means for scaling the position of the element in the received reflection based on the angle of the means for transmitting relative to the means for receiving and a focal length of the means for receiving, and wherein the position of the element in the received reflection corresponds to a position of the element in the transmitted structured light; and
means for generating a depth map for one or more images based at least on the scaled reflection.

22. The device of claim 21, wherein the means for transmitting transmits the same structured light during the entire generation of the depth map.

23. The device of claim 21, wherein the means for receiving comprises a first means for receiving, and wherein the means for generation comprises a first means for generating, the device further comprising:
a second means for receiving the generated depth map; and
a second means for generating graphical data for the one or more images based on the generated depth map.

24. The device of claim 21, wherein one of the means for transmitting or the means for receiving is parallel with a face of the device, and the other one of the means for transmitting or the means for receiving is tilted relative to the face of the device.

25. The device of claim 21, wherein a near field of view (FOV) generated by the means for transmitting and the means for receiving is closer to the device that includes the means for transmitting and the means for receiving as compared to if the means for transmitting is not angled relative to the means for receiving and the transmitter optical axis does not intersect the receiver optical axis.

* * * * *